(12) United States Patent
Semple et al.

(10) Patent No.: US 7,487,072 B2
(45) Date of Patent: Feb. 3, 2009

(54) METHOD AND SYSTEM FOR QUERYING MULTIMEDIA DATA WHERE ADJUSTING THE CONVERSION OF THE CURRENT PORTION OF THE MULTIMEDIA DATA SIGNAL BASED ON THE COMPARING AT LEAST ONE SET OF CONFIDENCE VALUES TO THE THRESHOLD

(75) Inventors: Bruce P. Semple, Potomac, MD (US); Frank L. Stein, Vienna, VA (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 10/912,616

(22) Filed: Aug. 4, 2004

(65) Prior Publication Data

US 2006/0031216 A1 Feb. 9, 2006

(51) Int. Cl.
*G06F 17/30* (2006.01)
*G06F 17/00* (2006.01)

(52) U.S. Cl. .............................. 703/3; 707/1; 707/102; 707/104.1

(58) Field of Classification Search ................. 707/204, 707/1–3, 5, 7, 10, 100, 104.1, 200, 102; 715/201, 715/205, 255; 709/203, 223–224; 345/440
See application file for complete search history.

(56) References Cited

U.S. PATENT DOCUMENTS 5,584,024 A * 12/1996 Shwartz ........................ 707/4
5,873,080 A * 2/1999 Coden et al. ................... 707/3
5,913,205 A 6/1999 Jain et al.
5,987,446 A 11/1999 Corey et al.

(Continued)

FOREIGN PATENT DOCUMENTS

EP 1251437 * 10/2002

(Continued)

OTHER PUBLICATIONS

G. Boccignone et al. "Automated threshold selection for the detection of dissolves in MPEG Video", IEEE 2000 pp. 1535-1538.*

(Continued)

*Primary Examiner*—Srirama Channavajjala
(74) *Attorney, Agent, or Firm*—Sughrue Mion, PLLC

(57) ABSTRACT

Methods and systems are provided that coordinate the operation of multiple search engines through portions of a multimedia object based on the anticipated accuracy of each search engine. One feature of the present invention provides a content management system that efficiently archives and retrieves multimedia content, for example, based on a confidence level or index. As multimedia content is generated, it is analyzed and cataloged into a set of indexes based on the analysis and confidence level of the analysis. The multimedia content is then stored into one or more databases. When one or more items are requested by a query, the query is analyzed and broken down into components or subqueries. These components or subqueries can then be routed to one or more appropriate search engine as a function of the confidence index. The results from the search engines are then gathered and compiled for presentation to a user.

18 Claims, 10 Drawing Sheets

U.S. PATENT DOCUMENTS

| | | | |
|---|---|---|---|
| 6,243,713 B1* | 6/2001 | Nelson et al. | 707/104.1 |
| 6,345,252 B1 | 2/2002 | Beigi et al. | |
| 6,445,834 B1 | 9/2002 | Rising, III | |
| 6,463,433 B1* | 10/2002 | Baclawski | 707/5 |
| 6,725,275 B2* | 4/2004 | Eyal | 709/231 |
| 6,751,606 B1* | 6/2004 | Fries et al. | 707/3 |
| 7,093,191 B1* | 8/2006 | Jain et al. | 715/501.1 |
| 7,257,774 B2* | 8/2007 | Denoue et al. | 715/719 |
| 7,383,260 B2* | 6/2008 | Smith et al. | 707/5 |
| 2002/0049756 A1 | 4/2002 | Chua et al. | |
| 2002/0069218 A1* | 6/2002 | Sull et al. | 707/501.1 |
| 2002/0143744 A1 | 10/2002 | Teng et al. | |
| 2002/0152199 A1 | 10/2002 | Teng et al. | |
| 2004/0183825 A1* | 9/2004 | Stauder et al. | 345/723 |
| 2005/0216443 A1* | 9/2005 | Morton et al. | 707/3 |

FOREIGN PATENT DOCUMENTS

| | | | |
|---|---|---|---|
| WO | WO 02/08940 | * | 1/2002 |
| WO | WO 02/071260 | | 9/2002 |

OTHER PUBLICATIONS

W.F.y et al. Querying multimedia data from multiple repositories by content: the Garlic project, 1995, pp. 1-19.*

Iln Eini et al. "A temporal data model for multimedia database systems", Research Report 252, Jun. 1997, pp. 1-6.*

* cited by examiner

METHOD AND SYSTEM FOR QUERYING MULTIMEDIA DATA WHERE ADJUSTING THE CONVERSION OF THE CURRENT PORTION OF THE MULTIMEDIA DATA SIGNAL BASED ON THE COMPARING AT LEAST ONE SET OF CONFIDENCE VALUES TO THE THRESHOLD

FIELD

This invention relates generally to managing enterprise content, and more particularly, to methods and systems for searching and retrieving multimedia content, such as audio and video information.

BACKGROUND

Today, enterprises often use a content management system to search and retrieve information from large databases. Commonly, text search engines are used to search and retrieve textual records in these databases using text queries and/or queries with logical operations on text. There are many known types of search engines that can perform these text searching functions.

However, enterprise often now use multimedia objects as part of their operations. These multimedia objects can contain text, images, audio, video, and/or any other type of sensory information as part of their content. Different types of search engines have also been developed to handle the different types of multimedia content.

Unfortunately, it is difficult to search and retrieve multimedia objects. For example, a search for multimedia objects for content related to "Porsche" can be a formidable task. In addition to a text-based search for the word "Porsche," it may be desirable to use a phonetic search engine to search for words that sound like "Porsche." In addition, it may be desirable to use an image search engine to search for images of various Porsche models. Therefore, it would be desirable to provide methods and systems that can coordinate the operation of multiple search engines across multiple types of media.

In addition, due to the time-based nature of video and audio content, it may be desirable to search for content in multimedia objects based on temporal constraints. For example, a user may wish to search for a video sequence "when a Porsche passes a Ferrari," or "when two Porsches go through an intersection within three minutes of each other." As another example, a user may wish to search for content in which a bright light (in video content) occurs within seconds of a loud noise (in audio content). Unfortunately, known content management systems cannot perform such searches through multimedia content with time-based constraints. Therefore, it would also be desirable to provide methods and systems that are capable of performing searches that have time-based constraints.

Furthermore, as another effect of the time-based nature of video and audio content, it may be desirable to coordinate which search engines are used to search through various portions of a multimedia object. For example, an audio file may include long periods of silence between sounds. In this instance, it may therefore be desirable to control when a phonetic search engine begins and ends its processing. As another example, if the sound for part of a video file is significantly distorted, it may be useful to rely on a text search engine to search through the text transcript for that part of the video rather than a phonetic search engine to search through the audio. Unfortunately, known content management systems simply direct a search engine to operate on the entire multimedia object regardless of its anticipated accuracy. This leads to inaccurate results and unnecessary use of system resources. Therefore, it would also be desirable to provide methods and systems that are capable of coordinating the operation of multiple search engines through portions of a multimedia object based on the anticipated accuracy of each search engine.

SUMMARY

In accordance with one feature of the invention, methods and systems are provided for archiving multimedia data. A multimedia data signal is received. The multimedia data signal includes content that progresses based on a timing. The multimedia data signal is converted into a searchable format. A set of features is identified in the searchable format and a set of confidence values is determined. The confidence values estimate the accuracy of the features in the searchable format as a function of the timing of the multimedia data signal. The searchable format is then stored into a database that is indexed based on the set of features and the confidence values.

In accordance with another feature of the invention, methods and systems are provided for managing searches through multimedia data that has been cataloged based on a time reference and a set of confidence values. A query that specifies a set of temporal parameters and content parameters is received. The query is parsed into a set of sub-queries. Search engines are selected for each of the sub-queries based on the time reference and the set of confidence values. A first set of results is gathered from each of the search engines that satisfy their respective sub-queries. The first set of results is then combined into a second of results based on satisfying the temporal parameters and content parameters of the query.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

One feature of the present invention provides a method and content management system that efficiently archives multimedia content. As multimedia content is generated, it is analyzed and cataloged into a set of indexes based on the analysis and confidence level of the analysis. The multimedia content is then stored into one or more databases.

Reference will now be made in detail to exemplary embodiments of the invention, which are illustrated in the accompanying drawings. Wherever possible, the same reference numbers will be used throughout the drawings to refer to the same or like parts.

Figure 1:
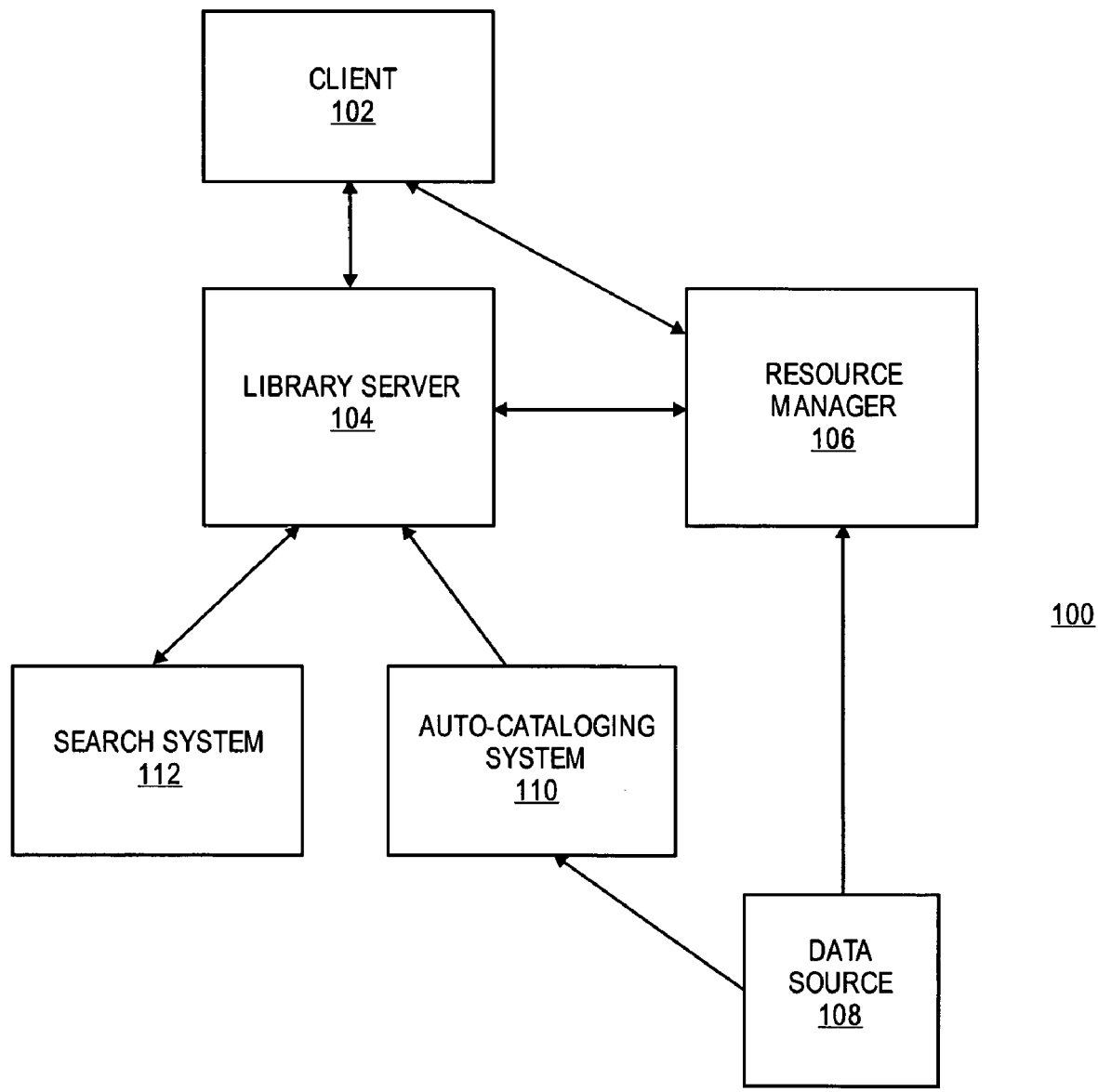
FIG. 1 shows a content management system that is consistent with the principles of the present invention.

FIG. 1 shows a content management system 100 that is consistent with the principles of the present invention. In general, content management system 100 may store, search, access, and retrieve items, such as text documents and multimedia objects. The items may contain objects, such as text, images, audio, video, and any other type of sensory information. Each item may include one or more objects of text and/or multimedia information. In addition, each object can have multiple multimedia aspects, that is, an object itself can contain one or more types of multimedia information, such as text, images, video, animation, or audio.

Content management system 100 can be implemented on a variety of platforms. For example, content management system 100 may be implemented based on technologies provided by the IBM Corporation. However, one skilled in the art will recognize that content management system 100 can be implemented on a variety of platforms. FIG. 1 illustrates how some embodiments can be implemented. As shown in FIG. 1, some embodiments of content management system 100 may be implemented based on Content Manager by the IBM Corporation. In particular, system 100 may comprise a client 102, a library server 104, a resource manager 106, a multimedia data source 108, an auto-cataloging system 110, and a search system 112. The general functions and roles of these components will now be described.

Client 102 serves as an interface for users of system 100. For example, client 102 may provide a graphical user interface, such as the Windows operating system by Microsoft Corporation or an Internet browser, so that a user may access the content stored by content management system 100. Alternatively, client 102 may include one or more applications that are configured to interface with the other components of system 100. For example, client 102 may include applications for allowing a user to enter queries, view multimedia data, or add annotations to multimedia items in system 100.

Library server 104 serves as a central source for indexing, locating, organizing, and managing the content in system 100. Library server 104 assists in locating stored items using a variety of technologies, provides secured access to items, and manages the transactions that are processed by content management system 100.

Resource manager 106 serves as a repository that is optimized to manage the storage, retrieval, and archival of items of an enterprise's content. For example, resource manager 106 may include document storage, image storage, and multimedia storage for video and audio. In addition, resource manager 106 may provide streaming media support for the playback of various types of video and audio files. Resource manager 106 may include its own indexing system that operates in conjunction with library server 104 in order to track the locations of objects and items.

Multimedia data source 108 represents the devices and systems that generate the content for the multimedia objects and items managed by content management system 100. For example, multimedia data source 108 may represent devices such as video cameras and microphones. In addition, multimedia data source 108 may be coupled to other processing devices that generate multimedia content, such as a server, computer, or other device. The multimedia content may include any type of time-based media, such as content that is frame-based or continuous. Multimedia data source 108 may continuously generate content or may generate content on an event driven basis. For example, multimedia data source 108 may receive feeds from a plurality of security surveillance cameras. Often times, these types of cameras produce "static" video content, which may be unnecessary. Accordingly, multimedia data source 108 may be configured to generate content when an event occurs, such as a set time period has elapsed, a significant scene change is detected, motion of an object in the video is detected, audio is detected from a person speaking, or a special control sequence is detected in the closed caption tract.

Auto-cataloging system 110 classifies the content generated by multimedia data source 108 and provides meta-data about the content as a function of time to library server 104 so that it may be indexed and later retrieved. For example, auto-cataloging system 110 may analyze the content from multimedia data source 108 for the presence of various concepts or features. Concepts and features that may be useful include things, such as skylines, people, buildings, water, crowds, children, boats, etc. In addition, text content from multimedia data source 108 may be analyzed by auto-cataloging system 110 for related words, phrases, topic areas, literary structure, and grammar as concepts or features that may assist with more complex types of queries, such as natural language queries. Auto-cataloging system 110 may be implemented based on known products, such as ViaVoice by IBM Corporation. In addition, auto-cataloging system 110 may be configured to process content in various languages. For example, auto-cataloging system 110 may use ViaVoice by IBM Corporation and one or more plug-ins for various languages. In some embodiments, auto-cataloging system 110 may also include a "manual cataloger" that allows a user to view content from multimedia data source 108 and enter meta-data, such as annotations or keywords, that supplements the meta-data generated by auto-cataloging system 110.

Furthermore, auto-cataloging system 110 may work in conjunction with multimedia data source 108 to analyze and record a "confidence" level in the content generated for a multimedia item. The confidence level may be a static value or may vary as a function of time through the course of a multimedia item. This confidence level may then be useful for, among other things, selecting one or more search engines. For example, if voice recognition technology is used to generate a transcription of an audio or video feed, then auto-cataloging system 110 may generate a series of confidence level values that indicate the accuracy of the voice recognition technology. The confidence level value may be based, for example, on the signal to noise ratio of the audio. Other factors that may affect the confidence include but are not limited to the contrast of an image or video, and the volume of the audio. In addition, in some embodiments, auto-cataloging system 110 may comprise multiple systems that catalog the content generated by multimedia data source 108. For example, auto-cataloging system 110 may process video and audio content in parallel using different systems to produce meta-data and confidence levels as a function of time. In the embodiments that include a manual catalog, appropriate adjustments could be made to the confidence level as part of the review by the human operator.

The confidence level may also be fed back to multimedia data source 108, for example, from auto-cataloging system 110. In response, multimedia data source 108 may then adjust the settings of one or more its components to improve the quality of the multimedia content being generated.

Search system 112 performs searches on behalf of content management system 100. Search system 112 may include one or more search engines that are optimized for different types of searches. For example, search system 112 may include text search engines, semantic search engines, query by image content ("QBIC") search engines, and phonetic search engines. The hardware and software and their equivalents for implementing search engines are well known to those skilled in the art.

These various components of content management system 100 may be coupled together using one or more networks, such as a local area network, or wide area network. In addition, these components may communicate with each other using known protocols, such as the transport control protocol and internet protocol ("TCP/IP") and hypertext transport protocol ("HTTP").

The components of content management system 100 may be implemented on separate devices or may be implemented on one or more of the same devices or systems. For example, library server 104 and resource manager 106 may be installed on the same machine and run under a common operating system. Alternatively, content management system 100 may have its components implemented on multiple machines that run different operating systems. These hardware and software implementations and their equivalents that may be used for system 100 are well known to those skilled in the art. The components of content management system 100 will now be further described below.

As noted, client 102 provides a user interface for content management system 100. Client 102 may be implemented using a variety of devices and software. For example, client 102 may be implemented on a personal computer, workstation, or terminal. In addition, client 102 may run under a Windows operating system, or through a browser application, such as Internet Explorer by Microsoft Corporation or Netscape Navigator by Netscape Communications Corporation. Although FIG. 1 shows a single client, content management system 100 may include any number of clients.

In addition, client 102 may include one or more applications that are configured to interface with the other components of system 100. For example, client 102 may include applications for entering queries, viewing multimedia data, or adding annotations to multimedia items in system 100. These applications and their equivalents are well known to those skilled in the art. For example, applications that provide a user interface for interactive queries are well known. In addition, applications for viewing multimedia content, such as Windows Media Player by Microsoft, RealOne Player by Real Networks, and QuickTime Player by Apple Computer, are well known. Client 102 may incorporate one or more of these applications to supplement the user's experience.

Library server 104 stores, manages, and provides access control to items stored by content management system 100. Library server 104 processes requests, such as creates, reads, updates, and deletes, from client 102 and maintains the data integrity between the other components of content management system 100, such as resource manager 106. For example, library server 104 may work in conjunction with search system 112 to search for various items based on one or more queries submitted by a user. Library server 104 may then work with resource manager 106 to retrieve an object in the content, such as a document or image file, in response to the query.

Library server 104 may be implemented using a variety of devices and software. For example, library server 104 may be a computer that runs one or more application programs and stored procedures under an operating system, such as z/OS, Windows, AIX, Linux, or Solaris. In addition, library server 104 may include a database management system, such as a relational database management system, to manage stored items and perform searches for content management system 100. For example, library server 104 may use the DB2 Universal Database by International Business Machines Corporation. Library server 104 is also described with reference to FIG. 4.

Resource manager 106 stores objects corresponding to items in content management system 100. Objects may be any data entity for an item that is in digital form. For example, an object may be an audio file, an application, an image, text, or a video file. In addition, an item may itself include or refer to multiple objects. For example, an item may include objects for high resolution video, low resolution video, periodic still frame images, audio, infrared or multi-spectral imagery, transcripts, or radio signals. Each of these objects may be created in parallel on a common time scale and may be processed, for example, by auto-cataloging system 110 to produce parallel tracks of meta-data and confidence data. Resource manager 106 may store the objects and items in various formats, such as JPEG images, MP3 audio, MPEG video, AVI video, and ASCII text. Resource manager 106 may also store objects in file formats, such as Microsoft Word, Lotus Word Pro, and Wordperfect.

Furthermore, resource manager 106 may be configured to store multiple copies of objects on the same or on a separate resource manager (not shown). Although FIG. 1 shows a single resource manager, content management system 100 may include any number of resource managers. For example, content management system 100 may include multiple resource managers that are optimized for particular types of content and distributed across one or more networks.

Resource manager 106 may be implemented using known devices and software. For example, resource manager 106 may be installed on one or more computers that run under the z/OS operating system, and includes a DB2 Universal Database, as well as a server to communicate with client 102 and library server 104, such as a HTTP server. In addition, resource manager 106 may include one or more storage devices, such as a magnetic disc drive. Resource manager 106 is also described with reference to FIG. 8.

Data source 108 generates the multimedia content for content management system 100. Data source 108 is implemented using known devices and software. For example, data source 108 may include a video camera, microphone, or other type of sensing device.

Data source 108 may provide and encode multimedia content based on any of known formats and protocols. These formats and protocols may include, but are not limited to, JPEG, and MPEG. Data source 108 is further described with reference to FIG. 2.

Auto-cataloging system 110 classifies the content generated by multimedia data source 108 and provides meta-data about the content to library server 104 so that it may be indexed and later retrieved. In particular, auto-cataloging system 110 may receive multimedia data as it is generated by data source 108. Auto-cataloging system 110 then analyzes the multimedia data and classifies it. For example, auto-cataloging system 110 may classify multimedia data into separate classes for audio, video, images, and text. In various embodiments, auto-cataloging system 110 is implemented as a software component on library server 104. Alternatively, auto-cataloging system 110 may be implemented on a separate device, such as a server, in which case auto-cataloging system 110 may be configured to pass its output to library server 104. Auto-cataloging server 110 is also described with reference to FIG. 3.

Search system 112 performs searches on behalf of content management system 100. Search system 112 may include or interface with one or more search engines that are optimized for different types of searches. For example, search system 112 may include text search engines, semantic search engines, query by image content ("QBIC") search engines, and phonetic search engines. Search system 112 may then collect the results from its search engines to form a result set, which is eventually presented to the user. Search system 112 is also described with reference to FIG. 7.

Figure 2:
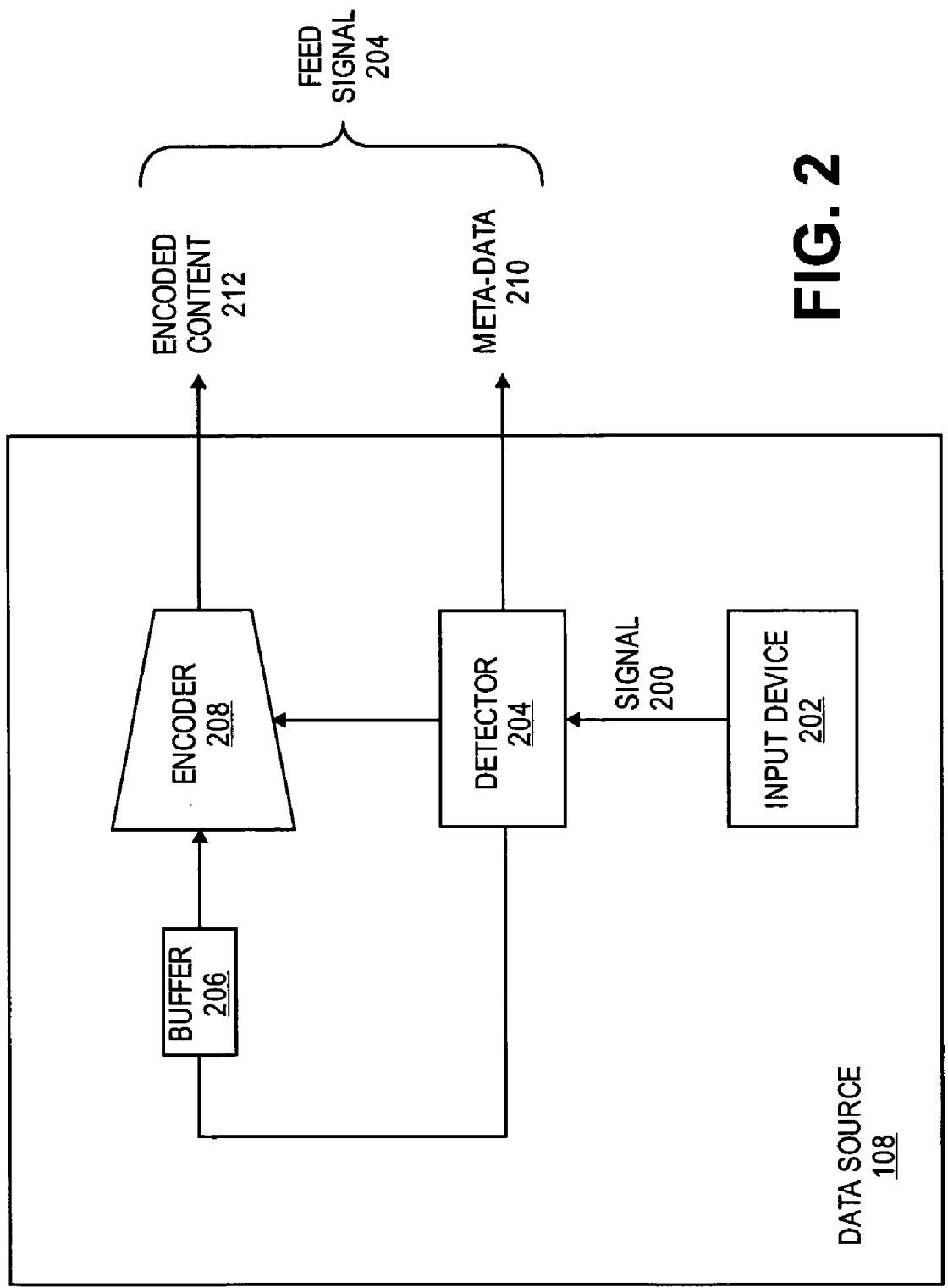
FIG. 2 shows a conceptual diagram of a multimedia data source that is consistent with the principles is invention.

FIG. 2 shows a conceptual diagram of multimedia data source 108 that is consistent with the principles of the present invention. In general, data source 108 receives a signal 200 from an input device 202 and then outputs a feed signal 204 to auto-cataloging system 110.

Signal 200 may be generated by input device 202 as a digital or analog signal. For example, signal 200 may be a digital signal that is formatted according to the MPEG standards. Other types of signals may also be used with the present invention.

Input device 202 may be any device or system that generates a multimedia signal. For example, input device 202 may be a device, such as a computer, video camera, or microphone. Although FIG. 2 illustrates a single input device, data source 102 may comprise or be connected to any number of input devices.

Input device 202 may be connected to data source 108 directly or indirectly through a network. For example, input device 202 may be connected to data source 102 via a coaxial cable or high speed digital cable, such as a Firewire cable. Alternatively, input device 202 may be connected to data source 108 through a local area network, such as an Ethernet network, or through a wide area network, such as the Internet.

The other components of data source 108 and their interconnection will now be described. As shown, data source 108 may further comprise a detector 206, an encoder 208, and a buffer 210. These components may be implemented using known devices.

Detector 206 may comprise hardware and software for detecting content in signal 200 from input device 202. For example, detector 206 detects when content is sensed based on a threshold signal level or based on certain events in the signal. Upon detecting content, detector 206 may then pass the content to buffer 210 and send a control signal to encoder 208.

In addition, detector 206 may provide a meta-data signal 212 to auto-cataloging system 110. The meta-data signal 212 may be carried within feed signal 204 and assists auto-cataloging system 110 in classifying and indexing the multimedia content generated by data source 108. For example, meta-data signal 212 may include information that indicates the content's format, framing, and a timing signal. For example, the MPEG standard specifies a well known timing model that uses a system time clock and decode time stamp to provide timing for a multimedia item or object. The timing signal may be derived from one or more aspects of this timing model, such as the program clock reference or system clock reference. Of course, other timing data may be used to generate a timing signal in accordance with the principles of the present invention.

Encoder 208 may comprise hardware and software for encoding the signals from input device 202 into a format that is suitable for storage and playback. In particular, encoder 208 outputs the encoded content into an encoded content portion 214. For example, encoder 208 may encode signals from a video camera into an MPEG video stream. The encoded content portion 214 is then provided to auto-cataloging system 110 as part of feed signal 204 for further analysis and to resource manager 106 for storage and archiving.

Buffer 210 synchronizes the operation of encoder 208 with detector 202. For example, buffer 210 may hold or delay the signal from input device 202 as it is being analyzed by detector 206. This delay or hold time allows detector 206 to analyze the signal from data source 108 and generate a control signal to encoder 208. The amount of time that buffer 210 holds or delays the signal may be a fixed, predetermined amount or may be varied. For example, buffer 210 may vary its hold or delay time based on the type of multimedia content being fed to input device 202. Buffer 210 may control its hold or delay time based on internal logic or based on commands from encoder 208, detector 206, or from a processor (not shown) within input device 202.

Figure 3:
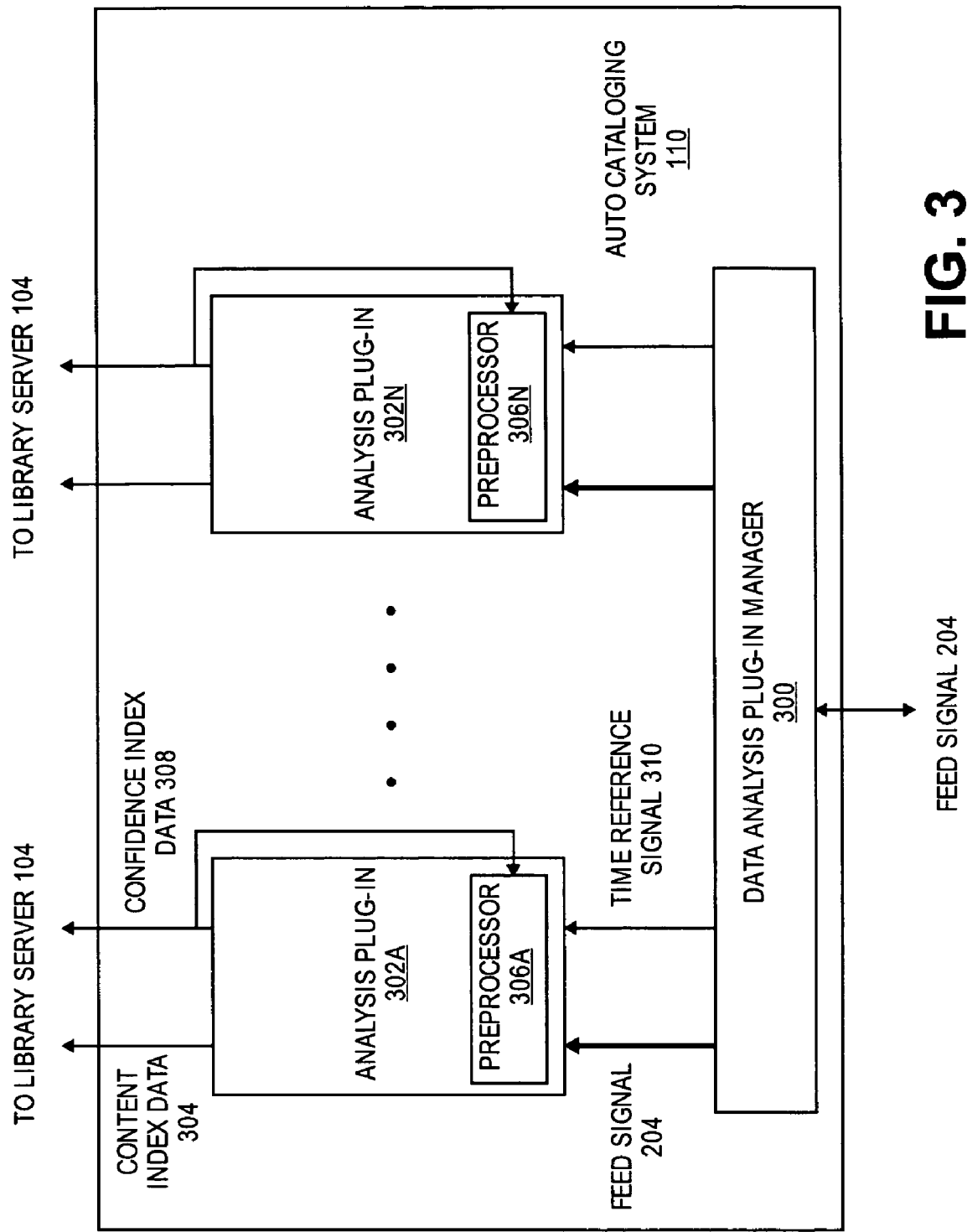
FIG. 3 shows a conceptual diagram of an auto cataloging system that is consistent with the principles of the present invention.

FIG. 3 shows a conceptual diagram of auto cataloging system 110 that is consistent with the principles of the present invention. As shown, auto cataloging system 110 may comprise a data analysis plug-in manager 300 and a plurality of analysis plug-ins 302*a-n*.

Data analysis plug-in manager 300 analyzes the signals, such as feed signal 204, received from data source 108. After analyzing feed signal 204, data analysis plug-in manager 360 routes feed signal 204 to one or more of analysis plug-ins 302*a-n*. Data analysis plug-in manager 300 may route the feed signal 204 based on several factors, such as media type, location of the data source, etc.

When routing feed signal 204, data analysis plug-in manager 300 may forward feed signal 204 along with a time reference signal 310. Time reference signal 310 indicates the timing by which the content in feed signal 204 progresses. As noted above, the MPEG standard, for example, specifies a well known timing model that uses a system time clock and-decode time stamp to provide timing for a multimedia item or object. Accordingly, time reference signal 310 may be derived from one or more aspects of this timing model, such as the program clock reference or system clock reference. Of course, other timing data may be used to generate a timing signal in accordance with the principles of the present invention.

Analysis plug-ins 302*a-n* analyze the content in feed signal 204 and generate index data 304 that describes the content. For example, analysis plug-ins 302*a-n* may be configured to recognize features, such as words, skylines, people, buildings, water, crowds, children, boats, etc. in a video stream in feed signal 204. As another example, while one or more of analysis plug-ins 302*a-n* may be analyzing a video for certain words, such as on-screen font detection, closed captioning, and other objects, other ones of analysis plug-ins 302*a-n* may be analyzing images in the video for specific items, such as a missile launcher or building. The audio may also be analyzed by analysis plug-ins 302*a-n* for sounds, such as sounds of gun shots, motor sounds, etc. The index data 304 may then be fed to library server 104 and/or search system 112. Based on index data 304, library server 104 may build a catalog as the content is stored. In addition, search system 112 may provide index data 304 to its constituent search engines so that they may build their respective search indexes.

Each of plug-ins 302a-n may further include preprocessors 306a-n that analyze the quality of the data in feed signal 204. The output of preprocessors 306a-n may then be used to affect the associated downstream output of analysis plug-ins 302a-n. For example, preprocessors 306a-n may vary the volume of an incoming audio portion of feed signal 204. In addition, preprocessors 306a-n may be used to adjust contrast and sharpness of images within feed signal 204.

Preprocessors 306a-n may be driven by confidence index data 308 generated by analysis plug-ins 302a-n. Confidence index data 308 are a measure of how accurate or confident that analysis plug-ins 302a-n estimate it has correctly identified content in the video or audio components of feed signal 204. A low confidence index may be used to cause preprocessors 306a-n to adjust its parameters for any given part of feed signal 204 to maximize the possibility that analysis plug-ins 302a-n will correctly identify the contents in feed signal 204. As shown, confidence index data 308 may be generated alongside content index data 304 and provided to library server 104.

Analysis plug-ins 302a-n may format confidence index data as a static confidence index value for a particular multimedia item or a series of confidence index values that vary according to time. For example, analysis plug-in 302a may use information from timing referencing signal 302 to serve as a primary key that links together content index data 304 and confidence index data 308 with various portions of the content in feed signal 204.

Furthermore, analysis plug-ins 302a-n may provide data that indicates the location of data source 108. For example, GPS data generated by data source 108 may be encoded and fed to cataloging system 110 and to library server 104 as part of feed signal 204. The receiver independent exchange format ("RINEX") is a known standard that allows various devices to share GPS data with other devices. Accordingly, in some embodiments, data source 108 may be configured to share and interpret GPS data based on the RINEX format with auto cataloging system 110. Of course, other formats for exchanging data, such as latitude and longitude, or addresses, are also well known and may be used by data source 108 and system 100.

Figure 4:
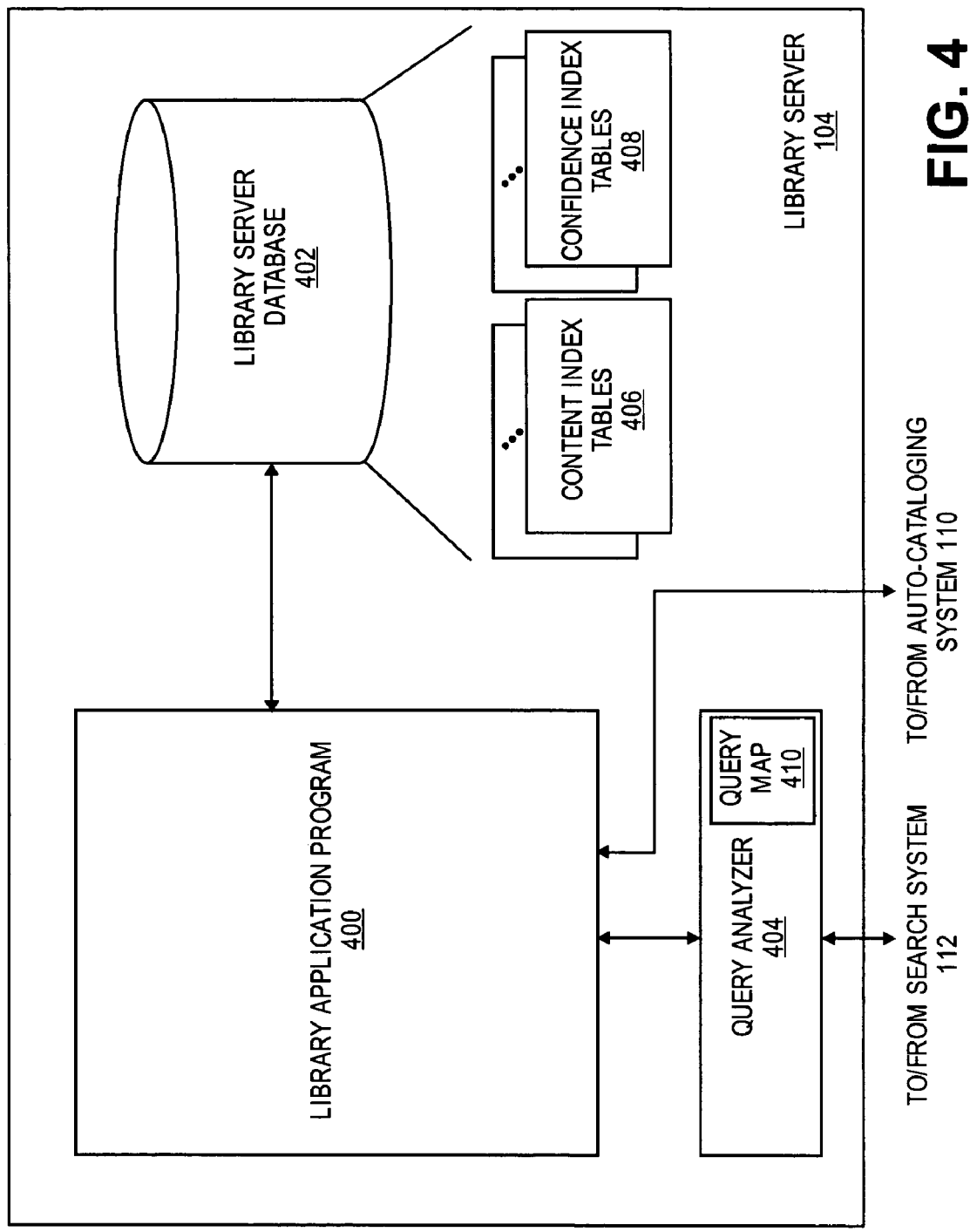
FIG. 4 shows a conceptual diagram of a server that is consistent with the principles of the present invention.

FIG. 4 shows a conceptual diagram of a server, such as library server 104, that is consistent with the principles of the present invention. As shown library server 104 comprises a library application program 400, a library server database 402, and a query analyzer 404.

Application program 400 is program code that implements the functions and procedures of library server 104, such as communications with client 102 and resource manager 106 and operations with library server database 402. Application program 400 may be written in a variety of host programming languages, such as C, C++, Java, or COBOL.

Library server database 402 serves as a catalog for items stored by content management system 100. In order to catalog a variety of items, library server database 402 may classify items according to information provided by auto cataloging system 110, such as the index data 304, confidence index data 308, time reference signal 310, and metadata 212. Library server 402 may automatically assign an identifier when the item is stored or updated. In addition, in order to allow for multiple versions of an item, library server 402 may classify items according to a version and timestamp.

Objects associated with a particular item, such as a document or video clip, may also be indexed by library server database 402. For example, library server database 402 may use an index that indicates an item's type. The item type specifies the format of the information. Documents, video, and audio corresponding to each item, such as a fax, or video clip, may then be stored as objects linked to a particular item in resource manager 106. Like items, objects may also have multiple versions.

Library server database 402 may be implemented using a variety of devices and software. For example, library server database 402 may be implemented as a relational database, such as a DB2 Universal database by IBM Corporation. In addition, library server database 402 may use a variety of types of storage, such as tape drive, optical storage units, or magnetic disk drive.

Library server database 402 may use a set of tables, such as a content index table 406 and confidence index tables 408. Index table 406 contains information that indexes the items stored by content management system 100. For example, index table 406 may index or reference objects stored by resource manager 106 for a particular item. Confidence index tables 408 contain information about the accuracy of information in the objects. One example of content index table 406 and confidence index tables 408 is further described with reference to FIG. 5.

Query analyzer 404 processes queries received by content management system 100 and determines how to perform a search for the content requested in the queries. In particular, query analyzer 404 may receive a query and parse it into one or more components. The query may be parsed based on media type, user input, or other criteria. Query analyzer 404 then operates in conjunction with search system 112 to select one or more appropriate search engines to handle each component of the query. In order to assist with coordinating the operation of the search engines and search system 112, query analyzer 404 may use a query map 410. Query map 410 provides an outline and plan for processing the various components of the query. One example of a query map 410 is further described with reference to FIG. 6

Figure 5:
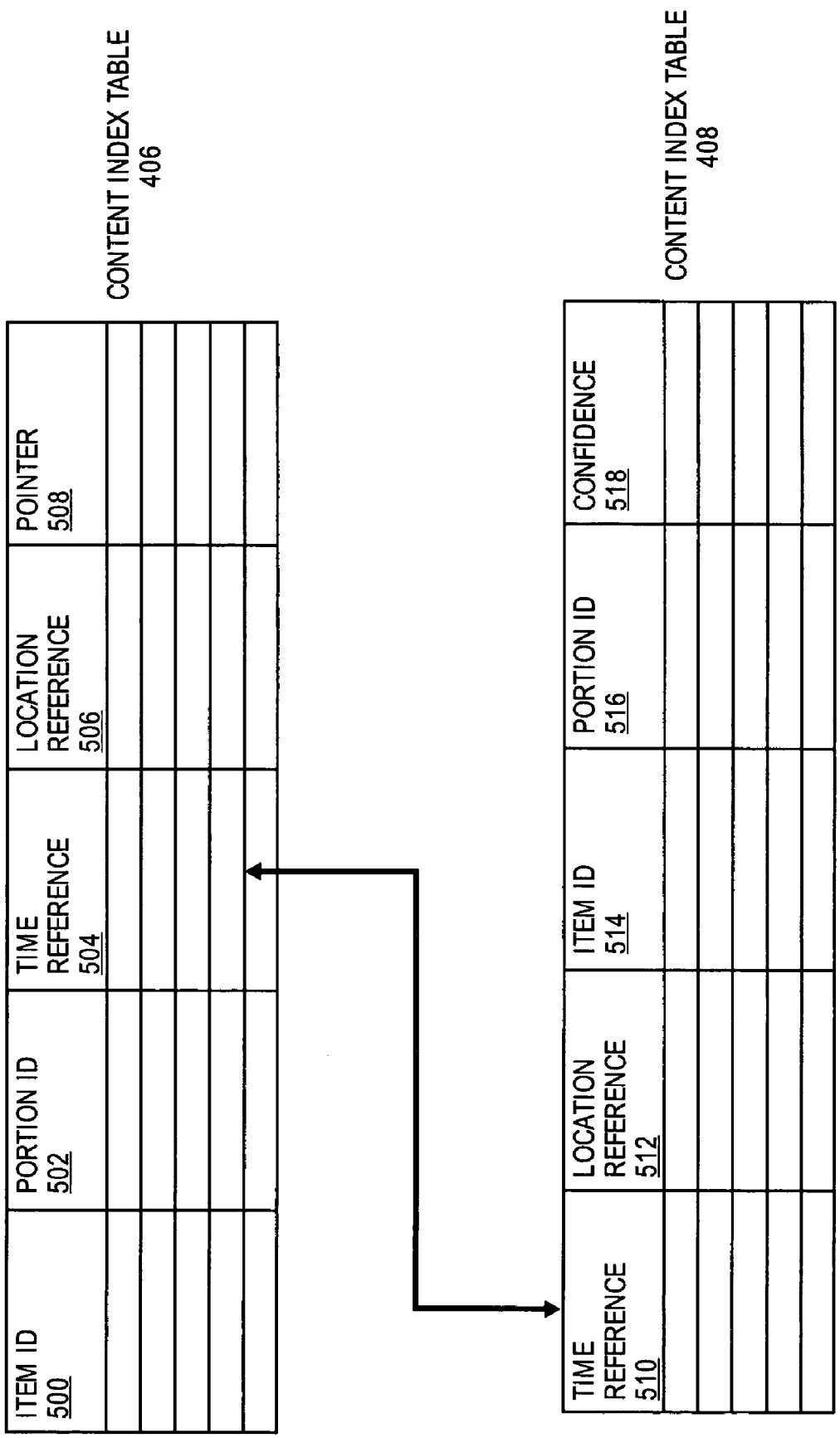
FIG. 5 illustrates examples of a content index table and confidence index table that may be used in accordance with the principles of the present invention.

FIG. 5 illustrates examples of a content index table 406 and confidence index tables 408 that may be used in accordance with the principles of the present invention. As shown, content index tables 406 may include an item identification column 500, a portion identification column 502, a time reference column 504, a location reference column 506, and a pointer column 508.

Item identification column 500 contains information that identifies a particular item as it is stored in resource manager 106. Item identification column 500 may use various types of identifiers in such as numeric, alphanumeric or some combination thereof. As noted above, in some embodiments, an item's identifier may be automatically generated by library server 104.

Portion identification column 502 contains information that identifies a specific portion or segment of the items and objects stored in resource manager 106. For example, portion identification column 502 may indicate identify a ten (10) second portion or segment of a video clip for an item.

Time reference column 504 contains information that indicates a particular time or period of time for an item stored by resource manager 106. For example, video may include time codes comprising HH:MM:SS:FF, where "H" denotes an hour, "M" denotes minutes, "S" denotes seconds, and "F" denotes a frame count. In some embodiments, the time reference information for column 504 is determined as a function of the data in time reference signal 310. The time reference in column 504, for example, may indicate times as specific as milliseconds.

Location reference column 506 indicates the location of where the content was captured. For example, location reference column 506 may include GPS data collected by data source 108. In some embodiments, location reference column 506 is optional, and thus, may be deleted or hidden from table 406. Location reference column 506 may be included or not based on a variety of factors, such as user input, configuration settings of library server 104, or parameters of a query.

Pointer column 508 includes information that points to a location in resource manager 106 where an item or object may be retrieved. Pointer column 508 may be numeric data or alphanumeric data. For example, information in pointer column 508 may point to a specific storage device in resource manager 106 or to a storage address in resource manager 106. In some embodiments, pointer column 508 may include uniform resource locators that point to locations within resource manager 106. As another example, pointer column 508 may include a full file name, such as E:/Olympic/Athens/marathon.mpeg.

As shown, confidence index tables 408 may include a time reference column 510, a location reference column 512, an item identification column 514, a portion identification column 516, and a confidence value column 518.

Time reference column 510 may include corresponding data that is the same as time reference column 504 of content index table 406. That is, time reference column 510 may serve as the primary key for linking content index table 406 to confidence index tables 408. Likewise location reference column 512, item identification column 514, and portion identification column 516 also include the same or similar information as columns 500, 502, and 506 respectively.

Confidence index tables 408 also include a confidence value column 518. Confidence value column 518 contains information that indicates the accuracy of the content as it has been analyzed by auto cataloging system 110. The confidence values may be determined as a function of confidence index data 308 and may be expressed in any form, such as a numeric or alphanumeric sequence. This information may then be used by library server 104 in determining which search engines of search system 112 to use for servicing a particular query or component of a query.

Figure 6:
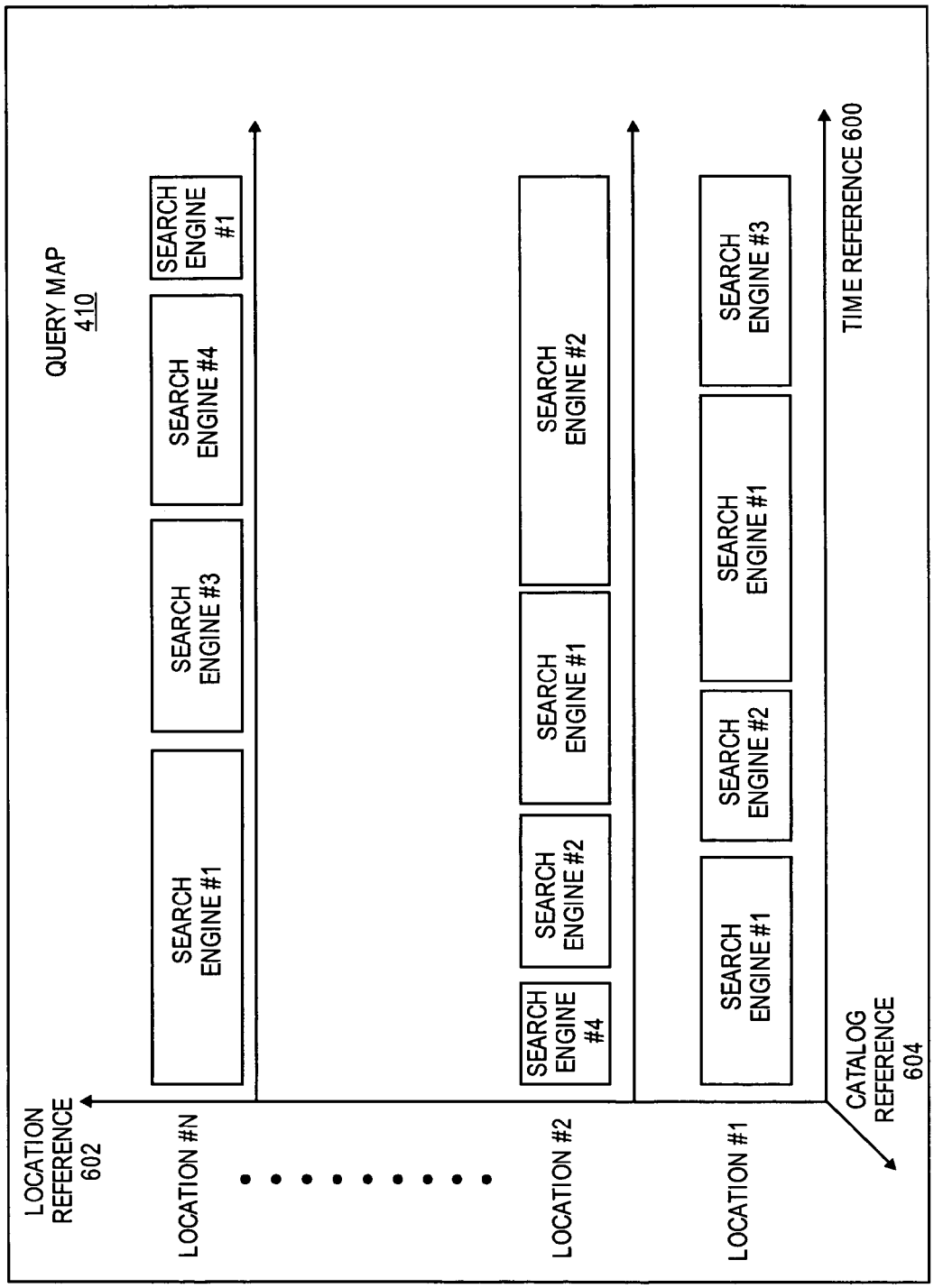
FIG. 6 illustrates a conceptual diagram of a query map that is consistent with the principles of the present invention.

FIG. 6 illustrates a conceptual diagram of a query map 410 that is consistent with the principles of the present invention. Query map 410 indicates which search engines of search system 112 are used during various time intervals and at various locations. For example, as shown, query map 410 provides a schedule of search engine usage for sets of items or objects based on locations and time intervals. In particular, each item may include multiple objects, such as objects for video, audio, and images. In turn, each of these objects may have a location, such as a set of GPS coordinates, a starting time point, such as (x, y, z, t). These items and objects may then be stored by resource manager 106 based on one or more "catalog" identifiers that reflect the starting time point and location. A catalog identifier may point to multiple objects or items. Over time, an object or item may move. In some embodiments, this movement may then be reflected in the catalog identifier, and thus, a moving object may be found in a search at multiple locations and time value pairs. FIG. 4 illustrates one example of query map 410 and, as shown, may include a time reference axis 600, location reference axis 602, and catalog reference axis 604. For convenience, one "plane" (e.g., one location) of query map 410 is illustrated.

Time reference axis 600 corresponds to the information in time reference columns 504 and 510 of tables 406 and 408 respectively. Therefore, as shown, query map 410 places each search engine of search system 112 on a common time reference scale.

Location reference axis 602 allows query map 410 to also specify a specific schedule for search engines at different locations for content. As shown, location reference axis 602 may specify any number of locations.

Catalog reference axis 604 allows query map 410 to specify different sets of items being stored in resource manager 106. For example, a search strategy for one set of items may have its own "plane" of query map 410, while a different search strategy for a second set of items may have a different plane. For example, sets of items may correspond to different cities, or different divisions of an enterprise. In addition, different sets of items may have differing security requirements that affect the allowable types of searches, and thus, may be segregated into a plane of query map 410.

Figure 7:
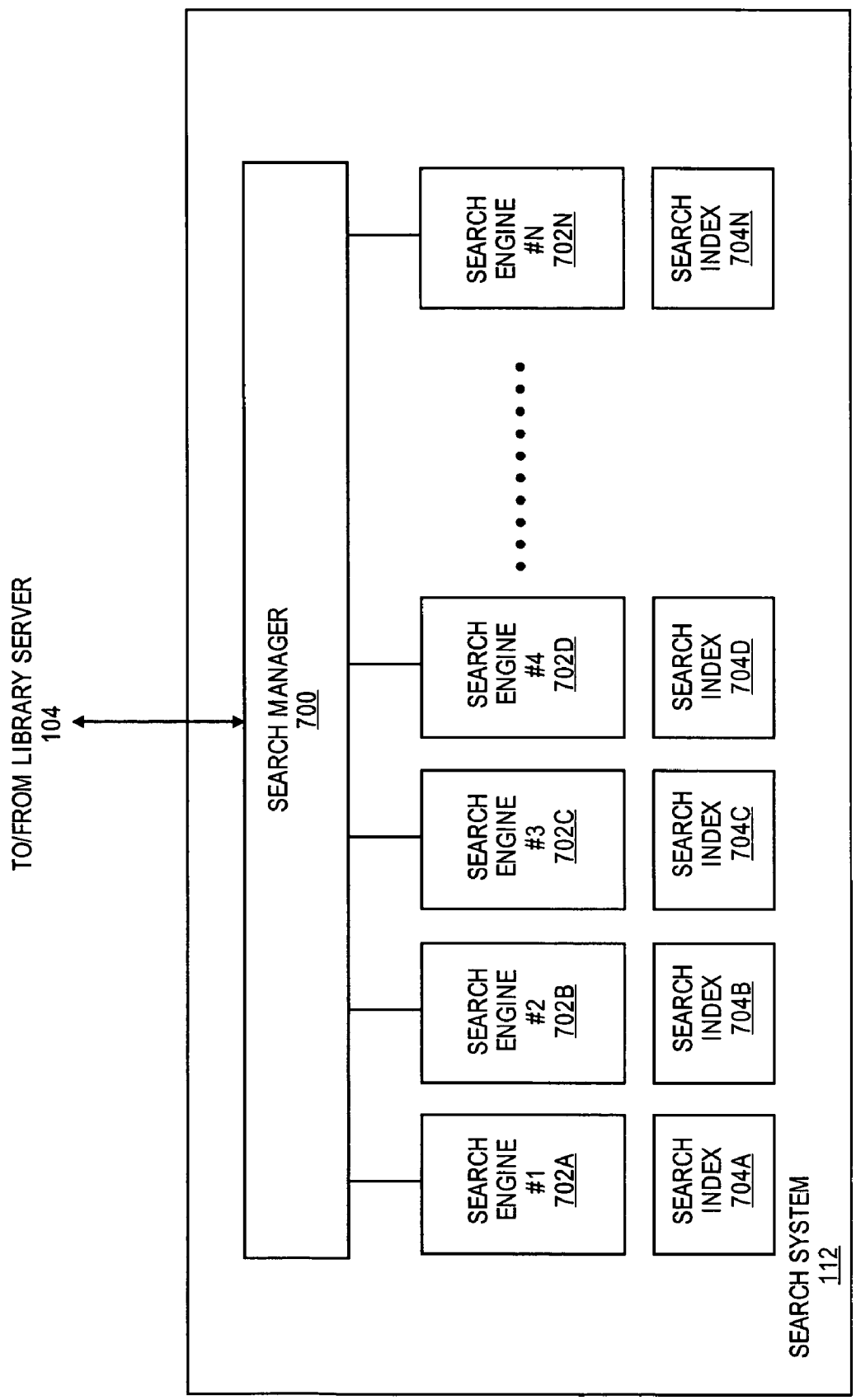
FIG. 7 illustrates a conceptual diagram of a search system that is consistent with the principles of the present invention.

FIG. 7 illustrates a conceptual diagram of a search system that is consistent with the principles of the present invention. As shown search system 112 of the may comprise a search manager 700, search engines 702a-n, and search indexes 704a-n.

Search manager 700 receives a query from library server 104, parses the query, and routes various portions of query to selected ones of search engines 702a-n. In particular, search manager 700 may use information from tables 406 and 408 to determine which of search engines 702a-n are the most appropriate for servicing particular query. For example, search manager 700 may select only those search engines that have a high confidence index value as indicated in confidence value column 518 of table 408. The search manager 700 also compiles and integrates the results from search engines 702a-n into a result set that may then be presented to the user.

Search engines 702a-n are modules of hardware and software that are configured to search for a particular portion of content that satisfy at least part of a query. Such search engines are known to those skilled in the art. For example, search engines 702a-n may include well-known text search engines, image search engines, and query by content ("QBIC") search engines. Upon completing their search, engines 702a-n may then provide one or more results to search manager 700.

Search indexes 704a-n assist search engines 702a-n respectively in performing their searches and may be implemented as one or more tables. In particular, search indexes 704a-n may include data that identifies each feature found in a particular item, such as words or images, a time reference for when that feature appears within an item, a location reference that identifies a location of the feature, a weight that indicates the relative significance of a feature.

Other information that may appear in search indexes 704a-n are the number of times that a feature appears within an item, the formatting of the feature, etc. The algorithms and structures that may be used to build search indexes 704a-n are well known to those skilled in the art.

Figure 8:
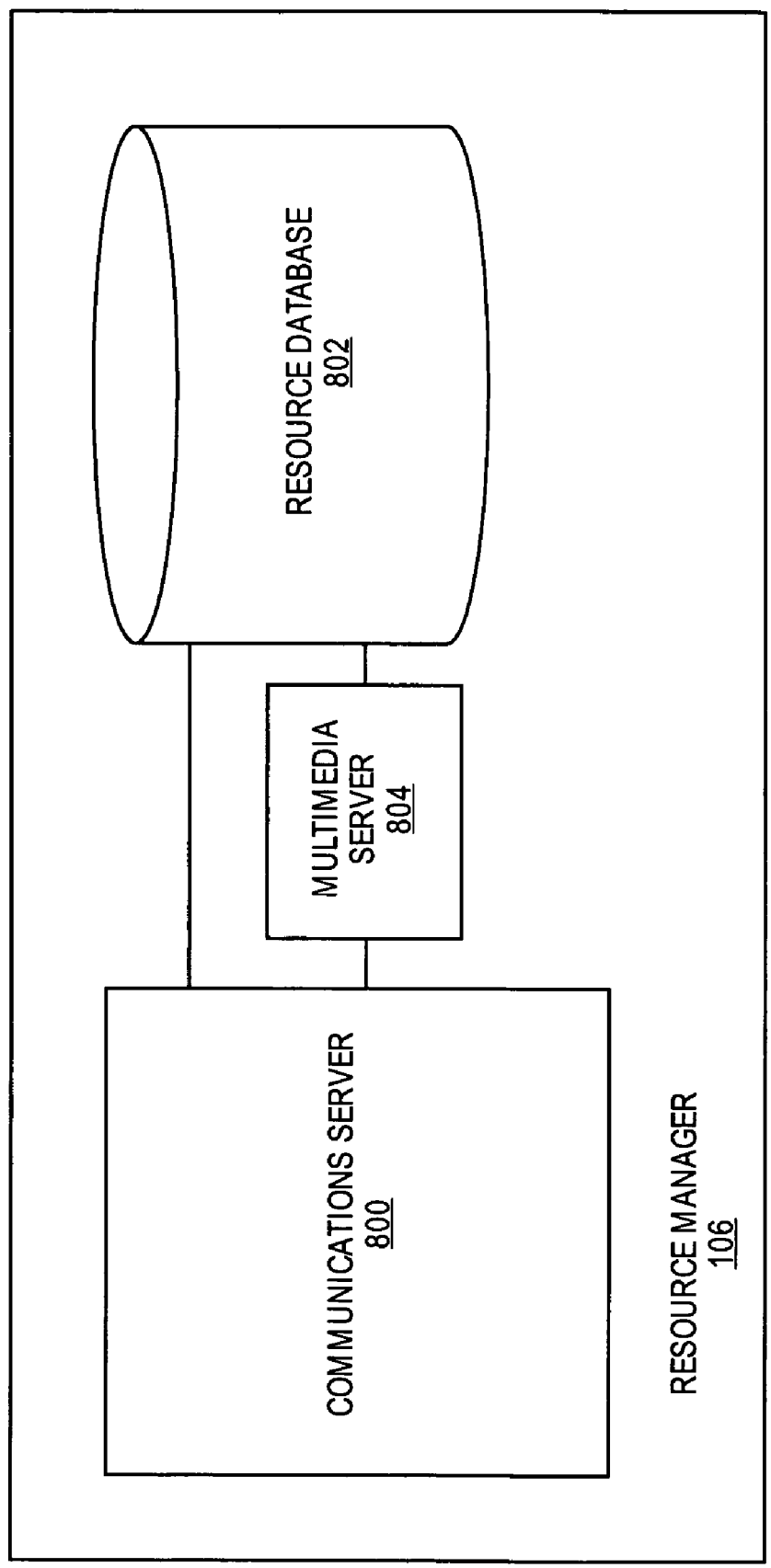
FIG. 8 illustrates a conceptual diagram of another server that is consistent with the principles of the present invention.

FIG. 8 illustrates a conceptual diagram of a server for managing resources of system 100, such as resource manager 106 that is consistent with the principles of the present invention. As shown, resource manager 106 may comprise a communication server 800, a resource database 802, and a multimedia server 804.

Server 800 provides communication services between resource manager 106, client 102 and library server 104. In some embodiments, communication server 800 is implemented as an HTTP server that is configured to communicate with client 102 and library server 104. In addition, communications server 800 may include one or more modules, such as a firewall, that provides security and controls access to items stored by resource manager 106. The hardware and software for implementing communications server 800 are well known to those skilled in the art.

Content database 802 manages and stores objects for content management system 100. Content database 802 may be implemented using a variety devices and software. For example, in some embodiments, content database 802 implemented as a relational database, such as the DB2 Universal database. In addition, content database 802 may use a variety of types of storage, such as a disk drive, or optical storage units.

Multimedia server 804 prepares the multimedia items stored by resource manager 106 for use by client 102. For example, multimedia server 804 may stream one or more multimedia items to client 102 based on the MPEG format. Other formats for serving multimedia items and content are well known to those skilled in the art and may be implemented into multimedia server 804. In addition, the hardware and software for implementing multimedia server 804 are well known to those skilled in the art.

Figure 9:
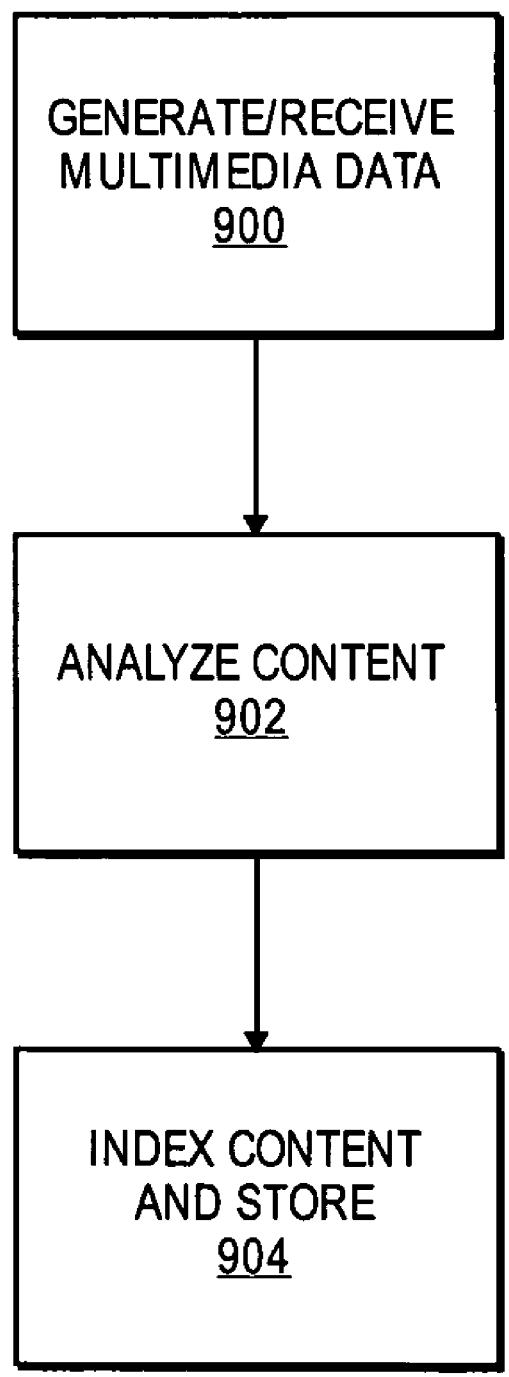
FIG. 9 shows a flow diagram for storing multimedia data in accordance with the principles of the present invention.

FIG. 9 shows a flow diagram for storing multimedia data in accordance with the principles of the present invention. In phase 900, data source 108 generates or receives multimedia items that are to be archived by system 100. For example, data source 108 may include a video camera that generates surveillance video of a particular location. The multimedia content from data source 108 is then fed to auto cataloging system 110.

In phase 902, the content is analyzed and cataloged for later reference and search. In particular, auto cataloging system 110 analyzes the multimedia content as it is being generated by data source 108 and generates metadata that describes various features of content in the multimedia data. For example, auto cataloging system 110 may create index data 304 describing various features in the multimedia data, determine a time reference signal 310, and determine a location, such as an address or GPS coordinates, for the multimedia data.

For example, auto cataloging system 110 may include plug-ins 302a-n that analyze the multimedia data from data source 108. Plug-ins 302a-n may further include preprocessors 306a-n that analyze the quality of the data from data source 108. Plug-ins 302a-n may then generate confidence index data 308 and provide this data to auto cataloging system 110. In some embodiments, plug-ins 302a-n may also feed back confidence index data 308 to preprocessors 306a-n in order to adjust the quality of feed signal 204. For example, in response to confidence index data 308, preprocessors 306a-n may send a control signal that adjusts the volume of an incoming audio signal from data source 108. As another example, preprocessors 312a-n may adjust contrast and sharpness of images generated by data source 108.

Furthermore, analysis plug-ins 302a-n may provide data that indicates the location of data source 108. For example, GPS data generated by data source 108 may be encoded and fed to cataloging system 110 and to library server 104 as part of feed signal 204 based on the RINEX format.

In phase 904, the multimedia data from data source 108 is indexed and stored by system 100. For example, the metadata generated by auto cataloging system 110 may be fed to library server 104. In some embodiments, this metadata may include content index data 304, confidence index data 308, time reference signal 310, and one or more portions of feed signal 204. Based on the metadata, library server 104 then generates content index tables 406 and confidence index tables 408 to allow for query analysis and searching of the content.

In addition, data source 108 may feed the multimedia data to resource manager 106. Resource manager 106 then encodes the multimedia data as one or more items stores the data into one or more of its storage devices. While encoding and storing the multimedia data, resource manager 106 may operate in conjunction with library server 104 to create a common index of the multimedia items. For example, library server 104 may provide to resource manager 106 one or more item identifiers and a data structure for the multimedia data.

Figure 10:
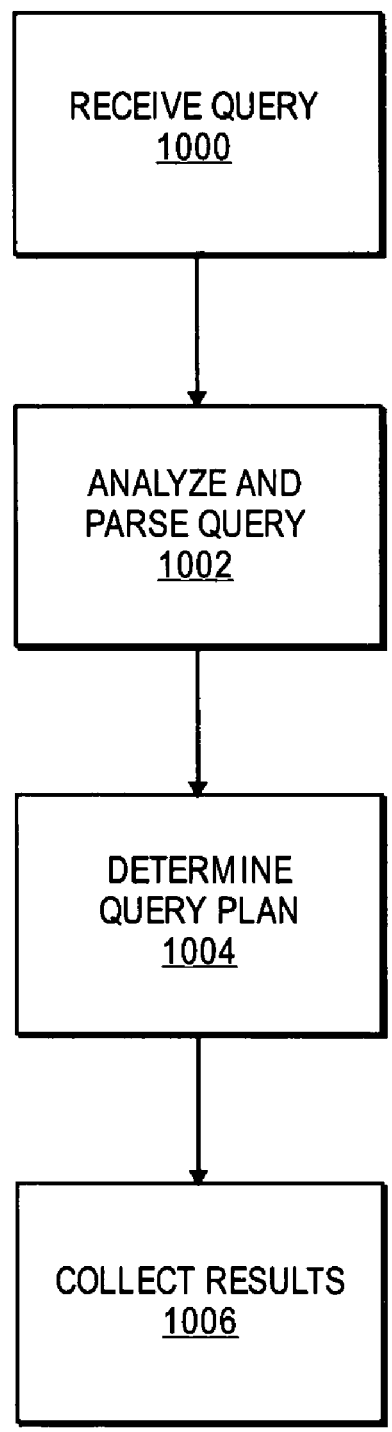
FIG. 10 shows a flow diagram for retrieving multimedia data in accordance with the principles of the present invention.

FIG. 10 shows a flow diagram for retrieving multimedia data in accordance with the principles of the present invention. In phase 1000, one or more queries are received by content management system 100. In particular, a user at client 102 may use one or more applications to enter various parameters for a query. These parameters may specify things, such as keywords or text, dates, times, file names, author or creator, location, media type, etc. A user may also specify one or more search engines in search system 112 and search criteria to be used by these search engines.

In order to assist with searching non-text content, such as images, video, or audio, client 102 may provide one or more applications that allow the user to provide a sample image, video clip, or audio clip from which to base a search. In addition, client 102 may provide its own set of symbols, images, or sample parameters on which to base a search. For example, client 102 may provide sample images for a man, woman, child, buildings, animals, or various other objects. Client 102 may also provide sample video and audio clips which assist the user in constructing and specifying the parameters of a query. Such applications and hardware are well known to those skilled in the art.

The query may relate to sophisticated searches that span across multiple search engines. For example, although many search engines internally support Boolean operators, system 100 may accommodate queries that apply Boolean operations across multiple search engines. That is, a search for "Ferrari" by a first search engine may be ANDed with a search for "Porsche" by a second search engine.

In addition, since system 100 may archive time-based multimedia, such as video and audio, temporal parameters may be used in the query. For example, a user at client 102 may query for spot in a video "when the man jumps out of the plane." System 100 may also allow queries for the offset from the beginning of a multimedia item or object to when a particular scene or audio event takes place. Furthermore, system 100 may allow one or more searches against multiple search engines that specify a time period between certain events. For example, system 100 may allow a query for all items in which the time between a bright light and a loud noise (one search against video items and the other against audio items) occur within five seconds.

System 100 may also accommodate certain location parameters for its queries. For example, system 100 may allow the user to query for all items in security surveillance video in which a Porsche passes a first location and then a second location within 5 seconds. Of course, the query by the user may combine each of these factors in numerous ways to create a sophisticated search.

In phase 1002, the query is analyzed by query analyzer 400 of library server 104 and is broken down into one or more components. Query analyzer 400 may break down a query based on a variety of schemes. For example, a query may be broken down by the media type associated with each of the parameters in the query. In some embodiments, a query may be broken down into components that handle the text parameters, image parameters, and video parameters separately.

In phase 1004, library server 104 develops query plan 410 to determine which search engines to employ and where/when to employ them. Library server 104 may then provide query plan 410 to search system 112. Search system 112 then selects one or more of search engines 702a-n to service the various parts of the query. For example, search system 112 may select search engines based on the query and check for features, such as whether a position is specified, whether a keyword is provided, or whether a type of object or item is specified. Search system 112 may communicate with search engines 702a-n to determine their properties and appropriate scopes of search. For example, search engines 702a-n may be divided into specific types, such as text, audio, image, and video. These types may be designated, for example, by an administrator of system 100. Alternatively, search engines 702a-n may communicate with search manager 700 to disclose their respective search properties based on known protocols, such as TCP/IP and XML. For example, search system 112 may query search engines 702a-n for their properties upon receiving a query or components of a query. Based on the properties of search engines 702a-n, search manager 700 may then determine which are suitable candidates for servicing particular queries and/or components of queries.

Search manager 700 may then submit the query and its components to one or more of search engines 702a-n. For example, a keyword search query, such as "truck" may trigger a full text search, a search for "truck" in an audio file or closed captioning track of a video file, a search for a truck in image files. Search manager 700 may also specify domain or scope restrictions for the servicing the query components in order to coordinate the search. For example, search manager 700 may specify a domain of "magazines" for one search engine, while specifying a domain of "video clips" to another.

Search engines 702a-n then attempt to service the query components. While servicing the query components, search engines 702a-n may also communicate with each other as well as with search manager 300 in order to coordinate the search. The extent of these communications may be based on the parameters specified in the query and based on one or more configuration settings determined, for example, by an administrator of system 100. Upon servicing their respective components of the query, search engines 702a-n return search results to the search manager 700. Search manager 700 may then merge these returned search results into a result set and provide it to library server 104.

Search manager 700 may consider confidence index data from confidence index table 408 to select appropriate ones of search engines 702a-n. As explained above, in some embodiments, these confidence index values are keyed to a common time reference, and thus, search manager 700 may also specify selected time intervals for when search engines 702a-n are used. For example, a phonetic search may be used for time intervals within an item having a high audio confidence, but a text search may be used for time intervals having a low audio confidence.

In determining which search engines are the most appropriate, search manager 700 may divide the query into various planes along catalog reference axis 604 of query map 410, based, for example, on content categories, search domain, access policies, user profile, etc. In particular, search manager 700 may consider one or "content categories" of the search. Content categories are broad classifications of content, such as "news," "sports," "business," etc. A content category may be provided by the user when entering the query or search manager 700 may determine a category based on the parameters of the query. For example, a query that includes the term "Ferrari" may be categorized as an "Automotive" type query. Selected content categories may be mapped to one or more of search engines 702a-n. Search manager 700 may map content categories to search engines 702a-n in various ways, for example, based on a lookup table or database (not shown).

Content categories may be arranged in a hierarchy. That is, high level categories may be the parents of other categories. In addition to a parent-child relationship, categories may also be associated with other related categories in addition to parents, children, and siblings.

Search manager 700 may also determine which of search engines 702a-n are appropriate for a query based on the "domain" of a search. A domain is broad grouping that is affected by the search and not directly related to content. For example, a domain may comprise a set of one or more servers within resource manager 106, which provide the physical storage for items. Hence, "IBM-US" may have a set of servers that are different from "IBM-Japan." Alternatively, a domain may also relate items for one or more organizations of a company, such as "Human Resources" versus "Engineering." Accordingly, search domains may be defined in various ways based on a variety of attributes, such as hardware device identifiers, access policies, and a range of dates. Search manager 700 may thus make its selection of an appropriate search engine and search technology based on the confidence index values for a given set of search parameters and the domain of the search.

Of note, content categories used by search manager 700 may be independent of the search domain. For example, a single content category of "sports" may comprise one or more domains. Conversely, a domain, such as "IBM," may relate to one or more categories of content, such as "products," and "consulting services."

Search manager 700 may also consider the access policies of search domain in selecting which of search engines 702a-n to use for a query. For example, some domains may require an authentication procedure, or certain payment term, before allowing a search to proceed. Further, search manager 700 may define a set of one or more of search engines 702a-n as default search engines and/or domains for particular content categories. These defaults may be overridden by the user by explicitly specifying a set of search engines and/or domains. Search manager 700 may also use or define access policies to restrict the return of certain items or objects in a result. For example, a photo of certain portions of a military base may require certain permissions. As another example, access policies may define who can see what data and define what actions are taken by system 100 if there is data that meets the search criteria but the person requesting the data lacks the appropriate access rights. In these circumstances, system 100 may enforce an access policy by inform another person, such as the requesting user's supervisor.

Search manager 700 may consider user profile information in selecting which of search engines 702a-n to use for a query. Profile information for a user may comprise information about prior searches submitted by the user and a user's preferences. This profile information may, for example, be stored in a table or database within library server 104 or at client 102. Search manager 700 may also provide the user profile information to search engines 702a-n so that when a query is received from a particular user, search engines 702a-n may vary how many search results to return to search manager 700, how to analyze various search terms, etc.

The scope of a search may be limited to information having a particular creation date or range of creation dates--for example, documents created on or after Jul. 1, 2000. The search scope may also be limited to content from one or more particular domains. For example, a user or system 100 may use the "where" clause of an SQL statement to limit the scope of a search.

In phase 1006, search manager 700 collects the results from search engines 702 provides the results to library server 104 in the form of a result set. In some embodiments, when forming the result set, search manager 700 may also execute any cross search engine parameters. For example, search manager 700 may perform Boolean operations across results search engine 702*a* with the results from search engine 702*b*. As another example, search manager 700 may check whether a flash of light found by search engine 702*a* occurs within ten seconds of a loud noise found by search engine 702*b*. Library server 104 may then provide the result set to client 102. Client 102 may present the result set to a user in variety of formats. For example, client 102 may present the result set as a list of links that point to locations within resource manager 106. Upon selecting one or more these links, such as by a mouse "click," client 102 may send a series of HTTP requests to resource manager 106. In response, communications server 802 of resource manager may invoke one or more client services, such as a common gateway interface ("CGI") script, servlets, simple object access protocol ("SOAP") interfaces, etc., by multimedia server 804 to retrieve and/or playback the selected multimedia item.

The result set may be compiled and ordered in a variety of ways by library server 104, search system 110, or client 102. For example, the items in the result set may be ordered by a relevance ranking, by date, etc. The result set may be compiled and ordered multiple times as well. That is, each of search engines 702*a-n* may provide their respective results based on a specific order. Search manager 700 may then combine and reorder the results as they are received collectively from search engines 702*a-n*. Furthermore, library server 104 and/or client 102 may perform their own reordering of the result set based, for example, on user settings, network communications requirements, and security policies. Of course, the present invention is not limited to any particular manner of presenting result sets.

For example, search results returned from multiple search engines may be merged. Each of search engines 702*a-n* may assign a unique (unique within the returned results) identifier to each document or object, in the return results. However, when results are returned from multiple search engines, these identifiers may collide, that is, may apply to more than one document or object in the merged results, even when the documents are different. In some embodiments, an identifier for each of search engines 702*a-n* is combined with an identifier for each returned document, such as a URL, so that there duplicate identifiers for the same document or object is avoided in the merged result set.

It is also possible that the search results from a first search engine 702*a* may identify a document which is the same as a document identified in the results returned from a second search engine 702*b*. To correct for this possibility, in some embodiments, search manager 700 may examine the URLs associated with each result from search engines 702*a-n*. When the URLs of two objects are identical, search manager 700 may remove one of the objects from the search results, or otherwise identify it as a duplicate.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of storing and searching multimedia data, the method comprising:
   receiving a multimedia data signal having content that progresses based on a timing;
   converting the multimedia data signal into a searchable format;
   identifying a set of features in the searchable format and outputting the set of features as content index data;
   determining a set of confidence values for the set of features in the searchable format that estimates the accuracy of the set of features in the searchable format as a function of the timing of the multimedia data signal and outputting the confidence values as confidence index data;
   linking the content index data and the confidence index data with the multimedia data signal as a function of the timing of the multimedia data signal;
   storing the content index data and the confidence index data into a database that is indexed based on the set of features and the confidence values;
   receiving, from a requestor, a query that specifies a set of temporal parameters and content parameters;
   parsing the query into a set of sub-queries;
   selecting respective search engines for each of the sub-queries, wherein the set of the sub-queries comprises at least two sub-queries, wherein the at least two sub-queries are transmitted to at least two different search engines based on confidence index data among the stored confidence index data which corresponds to the specified set of at least the content parameters;
   receiving, in response to the transmitted at least two sub-queries, results from the at least two different search engines; and
   transmitting the received results to the requestor,
   wherein the converting the multimedia data signal into the searchable format comprises:
   receiving at least one of the set of confidence values for a previous portion of the multimedia data signal; and
   adjusting the conversion of a current portion of the multimedia data signal based on the received at least one set of confidence values,
   wherein the adjusting the conversion of the current portion of the multimedia data signal comprises:
   comparing the at least one set of confidence values to a threshold; and
   adjusting the conversion of the current portion of the multimedia data signal based on the comparison of the at least one set of confidence values to the threshold.

2. The method of claim 1, wherein converting the multimedia data signal comprises:
   identifying an event in the multimedia data signal; and
   selectively converting the multimedia data signal based on the event.

3. The method of claim 2, wherein identifying the event in the multimedia data signal comprises identifying a time code in the multimedia data signal.

4. The method of claim 2, wherein identifying the event in the multimedia data signal comprises identifying a closed caption control sequence in the multimedia data signal.

5. The method of claim 2, wherein identifying the event in the multimedia data signal comprises identifying a scene change in the multimedia data signal.

6. The method of claim 2, wherein identifying the event in the multimedia data signal comprises detecting a threshold level of audio in the multimedia data signal.

7. The method of claim 2, wherein identifying the event in the multimedia data signal comprises identifying a slate in a video stream of the multimedia data signal.

8. The method of claim 1, wherein the receiving the results further comprises:
gathering a first set of results from each of the search engines that satisfy their respective sub-queries; and
combining the first set of results into a second set of results based on satisfying the temporal parameters and content parameters of the query.

9. The method of claim 8, wherein selecting the respective search engines for each of the subqueries further comprises selecting respective search engines based on a set of location parameters in addition to the temporal parameters and the content parameters.

10. The method of claim 8, wherein the combining the first set of results into a second set of results comprises identifying results from different multimedia data items that occur within a period of time that is specified in the query.

11. The method of claim 8, wherein receiving the query comprises receiving a query that specifies temporal constraints across a plurality of media types.

12. The method of claim 8, wherein receiving the query comprises receiving a query that specifies an offset of time within a multimedia data item.

13. The method of claim 8, wherein the parsing the query into the set of the sub-queries comprises parsing the query into sub-queries based on a type of media specified by the content parameters.

14. The method of claim 8, wherein selecting the respective search engines for each of the sub-queries further comprises selecting the respective search engines based on the temporal parameters and selecting a first search engine that searches a first time period of a multimedia item based on the confidence values and selecting a second search engine that searches a second time period of the multimedia item based on the confidence values.

15. The method of claim 8, wherein combining the first set of results into the second of results based on satisfying the temporal parameters and content parameters of the query comprises combining the first set of results into a set of references to multimedia data items that are ranked in terms of their relevance to the temporal parameters and the content parameters.

16. The method of claim 8, wherein the at least two sub-queries indicate two distinct events in the searchable format of the multimedia data; and the specified set of temporal parameters represent a time period between the two distinct events,
wherein the first set of results comprises at least one first event received in response to a first sub-query among the at least two sub-queries from a first search engine among the at least two different search engines, and at least one second event received in response to a second sub-query among the at least two sub-queries from a second search engine among the at least two different search engines, and
wherein the combining the first set of results into the second set of results further comprises generating the second set of results by classifying the at least one first event and the at least one second event based on the time period.

17. A system, executed on a processor, for storing and searching multimedia data, the system comprising:
a detector that detects a multimedia data signal having content that progresses based on a timing;
a converter, coupled to the detector, that converts the multimedia data signal into a searchable format;
an analyzer, coupled to the converter, that identifies a set of features in the searchable format and outputs the set of features as content index data, and the analyzer further determines a set of confidence values for the set of features in the searchable format, wherein the set of confidence values estimate the accuracy of the set of features in the searchable format as a function of the timing of the multimedia data signal, the confidence values output as confidence index data;
a module that links the content index data and the confidence index data with the multimedia data signal as a function of the timing of the multimedia data signal;
a set of storage devices that store the content index data and the confidence index data into a database that is indexed based on the set of features and the confidence values; and
a server configured to receive, from a requestor, a query that specifies a set of temporal parameters and content parameters, parse the query into a set of sub-queries, wherein the set of the sub-queries comprises at least two sub-queries, the server further selecting respective search engines for each of the sub-queries, wherein the at least two sub-queries are transmitted to at least two different search engines based on confidence index data among the stored confidence index data which corresponds to the specified set of at least the content parameters, and the server, in response to the transmitted at least two sub-queries, receives results from the at least two different search engines, and transmits the received results to the requestor,
wherein the server is further configured to gather a first set of results from each of the search engines that satisfy their respective sub-queries, and combine the first set of results into a second set of results based on satisfying the temporal parameters and content parameters of the query,
wherein the at least two sub-queries indicate two distinct events in the searchable format of the multimedia data; and the specified set of temporal parameters represent a time period between the two distinct events,
wherein the first set of results comprises at least one first event received in response to a first sub-query among the at least two sub-queries from a first search engine among the at least two different search engines, and at least one second event received in response to a second sub-query among the at least two sub-queries from a second search engine among the at least two different search engines, and
the server combines the first set of results into the second set of results by classifying the at least one first event and the at least one second event based on the time period to generate the second set of results.

18. A system, executed on a processor, for storing and searching multimedia data, the system comprising:
means for receiving a multimedia data signal having content that progresses based on a timing;
means for converting the multimedia data signal into a searchable format;
means for identifying a set of features in the searchable format and outputting the set of features as content index data;
means for determining a set of confidence values for the set of features in the searchable format that estimates the accuracy of the set of features in the searchable format as a function of the timing of the multimedia data signal and outputting the confidence values as confidence index data;

means for linking the content index data and the confidence index data with the multimedia data signal as a function of the timing of the multimedia data signal;

means for storing the content index data and the confidence index data into a database that is indexed based on the set of features and the confidence values; and means for receiving, from a requestor, a query that specifies a set of temporal parameters and content parameters, parsing the query into a set of sub-queries, wherein the set of the sub-queries comprises at least two sub-queries, the means for receiving further selecting respective search engines for each of the sub-queries, wherein the at least two sub-queries are transmitted to two different search engines based on confidence index data among the stored confidence index data which corresponds to the specified set of at least the content parameters, and the means for receiving, in response to the transmitted at least two sub-queries, receives results from the two different search engines, and transmits the received results to the requestor, wherein the means for converting converts the multimedia data signal into the searchable format by receiving at least one of the set of confidence values for a previous portion of the multimedia data signal, and adjusts the conversion of a current portion of the multimedia data signal based on the received at least one set of confidence values, wherein the means for converting adjusts the conversion of the current portion of the multimedia data signal by comparing the at least one set of confidence values to a threshold, and adjusts the conversion of the current portion of the multimedia data signal based on the comparison of the at least one set of confidence values to the threshold.

* * * * *